(12) United States Patent
Bruckmann et al.

(10) Patent No.: US 8,926,744 B2
(45) Date of Patent: *Jan. 6, 2015

(54) WATER-COMPATIBLE SOLS FOR COATING VARIOUS SUBSTRATES

(75) Inventors: Ralf Bruckmann, Tubingen (DE);
Matthias Koch, Filderstadt (DE);
Harald Lutz, Pliezhausen (DE); Peter Will, Oschingen (DE)

(73) Assignee: CHT R. Beitlich GmbH, Tubingen (DE)

( * ) Notice: Subject to any disclaimer, the term of this patent is extended or adjusted under 35 U.S.C. 154(b) by 752 days.

This patent is subject to a terminal disclaimer.

(21) Appl. No.: 12/739,151

(22) PCT Filed: Nov. 10, 2008

(86) PCT No.: PCT/EP2008/065220
§ 371 (c)(1),
(2), (4) Date: Apr. 22, 2010

(87) PCT Pub. No.: WO2009/062907
PCT Pub. Date: May 22, 2009

(65) Prior Publication Data
US 2010/0311295 A1 Dec. 9, 2010

(30) Foreign Application Priority Data
Nov. 15, 2007 (DE) .................. 10 2007 054 627

(51) Int. Cl.
| | | |
|---|---|---|
| C09D 183/04 | (2006.01) | |
| D06M 15/643 | (2006.01) | |
| C09D 183/06 | (2006.01) | |
| C09D 183/08 | (2006.01) | |
| C09D 183/14 | (2006.01) | |
| D06M 15/65 | (2006.01) | |

(52) U.S. Cl.
CPC ............ *C09D 183/04* (2013.01); *C09D 183/08* (2013.01); *C09D 183/06* (2013.01); *C09D 183/14* (2013.01); *D06M 15/643* (2013.01); *D06M 15/6436* (2013.01); *D06M 15/65* (2013.01); *D06M 2200/40* (2013.01); *D06M 2200/50* (2013.01)
USPC ............ 106/287.13; 106/287.11; 106/287.14; 252/8.61; 252/8.62

(58) Field of Classification Search
USPC ............ 106/287.11, 287.13, 287.14, 287.16; 252/8.61, 8.62
See application file for complete search history.

(56) References Cited

U.S. PATENT DOCUMENTS

| | | | |
|---|---|---|---|
| 6,319,980 B1 | 11/2001 | Ishikawa et al. | |
| 7,018,463 B2 | 3/2006 | Terry | |
| 8,394,187 B2 * | 3/2013 | Fritsche et al. ............ | 106/170.2 |
| 2004/0117915 A1 | 6/2004 | Xin et al. | |
| 2010/0203312 A1 * | 8/2010 | Bruckmann et al. ......... | 428/221 |

FOREIGN PATENT DOCUMENTS

| | | | |
|---|---|---|---|
| DE | 19756906 A1 | 7/1999 | |
| DE | 19816136 A1 | 10/1999 | |

(Continued)

OTHER PUBLICATIONS

Tanaka et a, "Preparation of highly dispersed silica-supported palladium catalysts by a complexing agent-assisted sol-gel method and their characteristics", Applied Catalysis A (2002), pp. 165-174.*

*Primary Examiner* — David M Brunsman
(74) *Attorney, Agent, or Firm* — Gregory N. Clements; Clements Bernard PLLC

(57) ABSTRACT

Processes for treating a wide variety of substrates with transparent, storage-stable and water-compatible inorganic/organic sols suitable for the surface functionalization comprising said transparent and storage-stable coating agent containing a water-compatible sol and water in a weight ratio of 100:1 to 1:500; said water-compatible sol obtained by mixing the following components:
(A) from 0.5 to 40% by weight of an organosol obtainable by the hydrolysis and condensation of one or more silicon compounds of general formula I

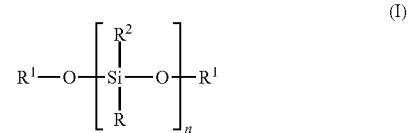

(I)

wherein R represents the same or different hydrocarbon groups with from 1 to 22 carbon atoms, optionally substituted with functional groups, which are bonded to the silicon atom through a carbon atom, optionally interrupted by oxygen, sulfur, nitrogen or the group NR3, with R3 being hydrogen or C1 to C14 alkyl;
  the radicals R1 are the same or different and represent R4 or Si(R5)3, wherein R4 are the same or different and each represent an optionally substituted hydrocarbon group with from 1 to 8 carbon atoms, optionally interrupted by oxygen, sulfur, nitrogen or the group NR3 with the meaning mentioned above; and R5 is R4 and/or O—R4;
R2 are the same or different and represent O—R1 or R4, R1 and R4 having the meanings as mentioned above; and n is from 1 to 30;
B) from 0 to 40% by weight of one or more alkoxides of general formula II Me(OR4)m (II) wherein in the case where n=1, Me represents Si and m is 4, and in the case where n>1, Me represents Si, Ti, Zr, Hf or Al, and m is the valence of the metal cation, and R4 has the meaning mentioned above;
(C) from 0 to 8% by weight of one or more complexing agents for reducing the hydrolysis rate of components (A) and (B); and
(D) from 12 to 99.5% by weight of one or more water-compatible or water-miscible solvents having a boiling point of at least 150 ° C.;
respectively based on 100% by weight of components (A), (B), (C) and (D) characterized in that alcohols having a boiling point of at most 160 ° C., formed during hydrolysis, are removed by distillation to adjust the flash point.

21 Claims, No Drawings

(56) References Cited

FOREIGN PATENT DOCUMENTS

| | | | |
|---|---|---|---|
| DE | 10063519 | A1 | 7/2002 |
| DE | 102006024727 | A1 | 11/2007 |
| EP | 1252214 | B1 | 11/2005 |
| EP | 1829945 | A1 | 9/2007 |
| JP | 2002053794 | A | 2/2002 |
| WO | 03/093383 | A1 | 11/2003 |
| WO | 2005/090502 | A2 | 9/2005 |

* cited by examiner

WATER-COMPATIBLE SOLS FOR COATING VARIOUS SUBSTRATES

The present invention relates to the preparation of storage-stable and water-compatible inorganic/organic sols suitable for the surface functionalization of a wide variety of substrates.

In textile technology, among others, it is sought to improve the physical mechanical properties permanently by the after-treatment of textile materials by coating or finishing; in addition, the material is to be provided with new properties, such as improved soft touch, hydrophilicity, hydrophobicity, antimicrobial effectiveness, flame-retardant property or UV protection. These properties are achieved by the application of a wide variety of finishing agents.

The coating or finishing of a textile material, especially for the clothing field, is subject to a permanent load, such as motion, friction or household laundering, to which each functional textile is exposed up to a hundred times. Household laundering is an extremely high load on the textile and the coating applied. A washproof coating or finishing must not be damaged by a swelling of the fiber, mechanical load or surfactants or alkali. Alkali resistance, which a washproof finishing must have, is particularly important, for in order to obtain as good a soil removal as possible during household laundering, a high pH value of the washing liquor is necessary. The soil and textile fiber are negatively charged, and the electrostatic repulsive forces are thus enhanced. In order to increase alkalinity, sodium carbonate is added to the detergent. Therefore, commercially available all-purpose detergents reach a pH value of 10 to 11 in the washing liquor. As generally known, many coatings are chemically attacked under such conditions and successively washed off. Specific chemical bonds, such as in ester linkages or silicon-oxygen bonds as found in silicone compounds, can be cleaved in an alkaline medium. A permanent coating should be uniform and cross-linked in a close-meshed way to avoid points of attack for the washing liquor. To ensure this, the coating agent must have a high number of cross-links. For this reason, educts having a high number of reactive groups that can undergo cross-linking with one another or reaction with a substrate are required for preparing such formulations.

As highly reactive cross-linking coating agents for glasses and polymeric plastics, sol-gel systems based on inorganic/organic composites are generally known. Sols employed for this purpose are mostly highly diluted solvent-based systems having a maximum solids content of 5 to 10%. From extended storage, addition of water, thermal load or concentration, the sols lose much of their stability and undergo transition into the gel state, which is no longer processable.

To date, such systems have not found access to the industrial scale in textile technology. This is essentially due to the fact that almost all processes and machines in the textile industry are adapted to application from aqueous baths and application liquors.

Therefore, due to the low water compatibility and low water stability of sols known from the literature, their use in the textile finishing industry is usually precluded. Also, systems having a high alcohol or solvents content usually cannot be employed, because drying and fixing are performed in non-explosion-proof plants, which are partly heated with an open flame, in almost all textile finishing plants. For this reason, it is mandatory to employ products that have an unproblematic flash point.

As alcohol-based sols are diluted with water to reach the textile application concentrations, the formulations have a high tendency to hydrolysis and condensation. The liquors become turbid after a short time, and in some cases a metal oxide will precipitate as a solid. Such unstable systems are not suitable for use as finishing agents for uniform application to the textile. If it is attempted to remove the alcohol released by the hydrolysis, for example, by distillation, for increasing the flash point, the sols are destabilized, and a water-insoluble gel forms, which clearly complicates further processing or makes it impossible. Concentrated sols for the formulation of coating systems for textile application must be water-compatible (i.e., miscible with water, among others), must not have a low flash point and must be stable in baths and application liquors, which may be aqueous, throughout the finishing process.

US 2004/0117915 A1 describes a multifunctional nanoscale surface treatment for textiles. In this process, a metal oxide matrix is applied for improving the surface properties. It is noted that the textile and the nanosol formulation must be anhydrous during the application.

DE 19756906 A1 claims coating agents for textile and polymeric materials. The coating agent is prepared from three components, a) a film-forming organosol, b) an aluminum or zirconium halide, and a cross-linking compound having at least two hydroxy groups, which are storage-stable as such, but are mixed only immediately before the coating and have a very limited stability as a mixture.

DE 19816136 A1 describes nanostructured molded parts and layers and the preparation thereof via stable water-soluble precursors. Aqueous colloidal suspensions are coated with reactive monomeric or oligomeric components. Thus, aqueous sols, such as boehmite, $TiO_2$, $ZrO_2$ or $SiO_2$ sols, can be reacted to obtain clear solutions that are stable over an extended period of time after concentration and optionally dispersion of the liquid residue in water, the stripping of the solvent being required for the stabilization of the system. The reactive components described are various silanes with which the sols are reacted. The silicon-oxygen bonds formed thereby are insufficiently fast to washing due to their low alkali stability. The thus prepared systems are applied to glasses, plastics and metals for optical purposes.

DE 10063519 A1 describes low-solvent sol-gel systems obtainable by a) the hydrolysis or condensation of a silane, alkoxide or several alkoxides of different main group or subgroup elements and b) the addition of water until phase separation occurs, and c) separation of the condensate phase. The water-insoluble condensate phase can be taken up again in water only by using a dispersing aid, and the resulting dispersion is employed as a binder for various substrates.

EP 1 252 214 B1 relates to an organometallic composition comprising a complex of at least one orthoester of a metal with the formula $M(ROAcAc)_x(OR')_y$, wherein (a) M is selected from the group consisting of titanium, zirconium and hafnium;
(b) ROAcAc represents an ester of an alcohol ROH, wherein R is a (optionally substituted) $C_{1-30}$ cyclic, branched or linear alkyl, alkenyl, aryl or alkylaryl group or a mixture thereof, with acetoacetic acid;
(c) OR' is the residue of an alcohol R'OH, wherein R' is a (optionally substituted) $C_{7-30}$ cyclic, branched or linear alkyl, alkenyl, aryl or alkylaryl group or a mixture thereof; and
(d) x and y are each within a range of from 1 to 3, and $x+y=4$; with the proviso that, when M is zirconium, R' is not a $C_{7-8}$ alkyl or alkoxyalkyl group.

WO 03/093383 A1 describes substrates provided with a biofilm-inhibiting coating of an inorganic condensate modified with organic groups, wherein at least part of the organic groups of the condensate has fluorine atoms, and copper or silver colloids are contained in the coating.

DE 10 2006 024 727 A1 describes a sol-based water-dilutable concentrate for the preparation of coating agents, containing an admixture of the following components:

(A) from 0.5 to 25% by weight of an organosol obtainable by the hydrolysis and condensation of one or more alkoxysilanes of general formula I $$R_{4-x}Si(OR')_x \qquad (I)$$

wherein

R' represents optionally substituted hydrocarbon groups with from 1 to 8 carbon atoms, and the radicals R' are the same or different and each represent an optionally substituted hydrocarbon group with from 1 to 22 carbon atoms, and x is 1, 2 or 3;

(B) from 4 to 55% by weight of one or more alkoxides of general formula II $$Me(OR')_n \qquad (II)$$

wherein

Me represents Ti, Zr, Hf or Al, n is the valence of the metal cation, and R' has the same meaning as mentioned above;

(C) from 0.1 to 15% by weight of one or more complexing agents for reducing the hydrolysis rate of components (A) and (B); and (D) from 5 to 95% by weight of a water-compatible or water-miscible solvent having a boiling point of at least 150° C.; respectively based on 100% by weight of components (A), (B), (C) and (D).

Therefore, it is the object of the present invention to provide storage-stable inorganic/organic sols that can be mixed with water and optionally a dispersing aid to form coating agents, especially for textile materials, wherein the substrate loses only slightly, if at all, its original flexibility after the coating.

In a first embodiment, the above object is achieved by a process for the preparation of storage-stable and water-compatible sols for the functionalization of surfaces by mixing the following components:

(A) from 0.5 to 40% by weight of an organosol obtainable by the hydrolysis and condensation of one or more silicon compounds of general formula I

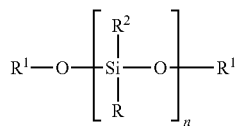
(I)

wherein

R represents the same or different hydrocarbon groups with from 1 to 22 carbon atoms, optionally substituted with functional groups, which are bonded to the silicon atom through a carbon atom, optionally interrupted by oxygen, sulfur, nitrogen or the group $NR^3$, with $R^3$ being hydrogen or $C_1$ to $C_{14}$ alkyl;

the radicals $R^1$ are the same or different and represent $R^4$ or $Si(R^5)_3$, wherein $R^4$ are the same or different and each represent an optionally substituted hydrocarbon group with from 1 to 8 carbon atoms, optionally interrupted by oxygen, sulfur, nitrogen or the group $NR^3$ with the meaning mentioned above; and $R^5$ is $R^4$ and/or $O-R^4$;

$R^2$ are the same or different and represent $O-R^1$ or $R^4$, $R^1$ and $R^4$ having the meanings as mentioned above; and n is from 1 to 30;

(B) from 0 to 40% by weight of one or more alkoxides of general formula II $$Me(OR^4)_m \qquad (II)$$

wherein in the case where n=1, Me represents Si and m is 4, and in the case where n>1, Me represents Si, Ti, Zr, Hf or Al, and m is the valence of the metal cation, and $R^4$ has the meaning mentioned above;

(C) from 0 to 8% by weight of one or more complexing agents for reducing the hydrolysis rate of components (A) and (B); and (D) from 12 to 99.5% by weight of one or more water-compatible or water-miscible solvents having a boiling point of at least 150° C., preferably at least 160° C.; respectively based on 100% by weight of components (A), (B), (C) and (D);

wherein the reaction is optionally followed by removing the alcohol formed in the hydrolysis by distillation at a boiling point of up to 160° C. to adjust a flash point of the reaction product of at least 65° C., especially at least 100° C.

Thus, these compositions are distinguished from those disclosed in DE 10 2006 024 727 A1 in that two alternatives are provided for component (B) (n=1 or n>1), wherein the alternatives resulting as a function of n are clearly different from the compositions in DE 10 2006 024 727 A1 (this is true even for the case of 0% by weight of component (B), since DE 10 2006 024 727 A1 positively requires alkoxides corresponding to the general formula II of the present invention, i.e., in an amount of from 4 to 55% by weight).

The above mentioned organosol can be obtained by the per se known hydrolysis and condensation of the monomeric or polymeric silicon compounds, especially without the presence of dispersing aids. For example, it is possible to admix corresponding components with an aqueous acidic solution to obtain a corresponding hydrolysate, especially a clear one.

Examples of radicals R in the above formula include linear and/or branched alkyl, alkenyl, aryl, alkylaryl, arylalkyl, arylalkenyl, alkenylaryl radicals (preferably each having from 1 to 22, especially from 1 to 16, carbon atoms, including cyclic forms) which may be interrupted by oxygen, sulfur, nitrogen atoms or the group NR" (R" being hydrogen or $C_{1-14}$ alkyl) and may bear one or more substituents selected from the group consisting of halogens and optionally substituted amino, amide, ammonium, carboxy, mercapto, isocyanato, hydroxy, alkoxy, alkoxycarbonyl, acryloxy, methacryloxy, epoxy or perfluorinated alkyl groups.

More preferably, the above alkoxy compounds of general formula (I) include at least one in which at least one radical R bears a group capable of undergoing a polyaddition (including polymerization) or polycondensation reaction.

The above group capable of undergoing a polyaddition or polycondensation reaction is preferably an epoxy group or (preferably activated) carbon-carbon multiple bonds (especially double bonds), wherein a (meth)acrylate group is a particularly preferred example of the latter groups.

Component (A) with n>1, i.e., alkoxy-functional organomodified siloxanes of general formula (I), may preferably be prepared by a two-step synthesis consisting of an equilibration and a subsequent hydrosilylation reaction:

In a first step, alkoxy-functional silanes (III) are reacted with cyclic siloxanes (IV) and methylhydrogensiloxanes (V) by means of a catalyst until an equilibrium is reached (see reaction scheme 1). This reaction is known by the designation of "equilibrium reaction" and is further described, for example, by W. Noll, Chemie and Technologie der Silicone, 1968, pp. 188 ff.

Reaction scheme 1:

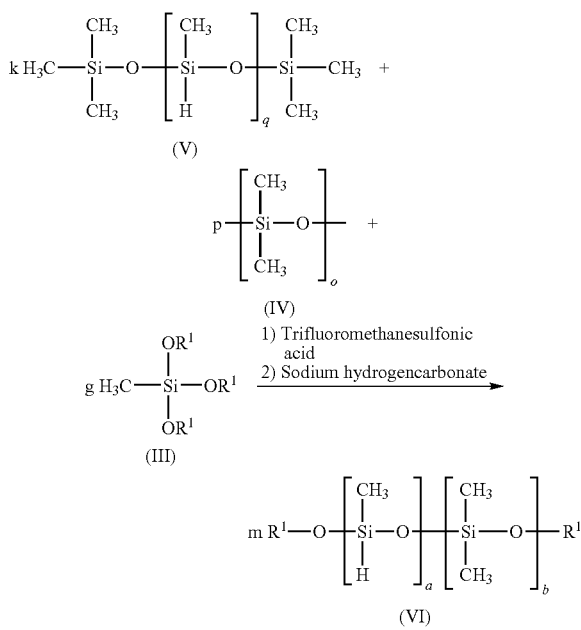

In a second step (see reaction scheme 2), the hydrosilylation step, the hydrogensiloxane (V) obtained is reacted with the desired allyl compounds (VII) as described in EP 1 448 648 B1.

Reaction scheme 2:

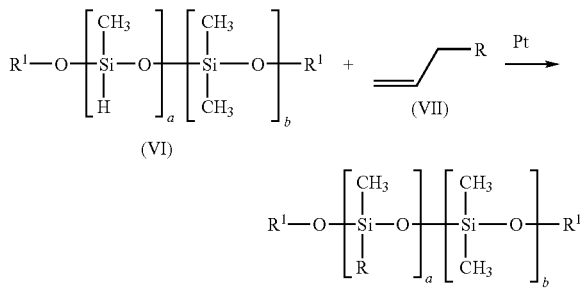

For the chemistry of the polysiloxanes, especially for hydrosilylation, reference is made to Walter Noll, Chemie and Technologie der Silicone, Verlag Chemie, Weinheim, Germany, 2nd revised edition 1968, ISBN: 0125207506, and to Bogdan Marciniec (Ed.), Comprehensive Handbook of Hydrosilylation, pp. 11-18, Pergamon Press 1992.

The polysiloxane obtained after the hydrosilylation step mostly still contains excess amounts of unreacted allyl compound (VII) as an impurity. However, this does not prevent the further application of the polysiloxanes in the present invention. The polysiloxanes prepared by the above processes generally have a viscosity at 20° C. of 15 mPa·s to 1000 mPa·s, preferably from 70 to 700 mPa·s.

Further, if at least one alkoxide of general formula (II) is then added to the hydrolysate in the course of the reaction, a first reaction already occurs.

The alkoxides employed according to the invention (component B) of general formula (II) are highly reactive, so that components (A) and (B) would hydrolyze very quickly upon contact with water in absence of complexing agent (C).

However, according to the invention, it is not required to employ the reactive alkoxides directly in a complexed form. Rather, it is possible to add the complexing agent or agents briefly after the start of the reaction of components (A) and (B).

Concrete examples of such compounds include aluminum sec-butylate, tetramethoxysilane (TMOS), tetraethoxysilane (TEOS), tetraisopropoxysilane, titanium isopropoxide, titanium propoxide, titanium butoxide, zirconium isopropoxide, zirconium propoxide, zirconium butoxide, zirconium ethoxide.

However, especially for the more reactive alkoxides (for example, of Al, Ti, Zr etc.), it may be recommendable to employ them directly in a complexed form, examples of suitable complexing agents including saturated and unsaturated carboxylic acids and β-dicarbonyl compounds, such as acetic acid, lactic acid, methacrylic acid, acetylacetone and acetoacetic acid ethyl ester. Also suitable are ethanolamines and alkyl phosphates, such as tri-, diethanolamine and butyl phosphate.

Concrete examples of such complexed alkoxides include titanium acetylacetonates, titanium bis(ethylacetoacetates), triethanolamine titanates, triethanolamine zirconates or zirconium diethylcitrates.

The complexing agent (C), especially a chelating compound, causes some complexing of the metal cation, so that the hydrolysis rate of components (A) and (B) is reduced.

As a further component, the water-dilutable mixture according to the invention comprises a water-compatible or water-miscible solvent having a boiling point of at least 160° C.

For example, diethylene glycol or triethylene glycol may be employed. Further, for example, butyldiglycol, propylene glycols, butylene glycols, polyethylene glycols may be used as component (D).

The purpose of the high-boiling solvents is, in particular, that an improved stability of the mixtures according to the invention can be achieved as a compensation for the low molecular weight alcohol released during the hydrolysis.

In a preferred embodiment of the present invention, the mixture is characterized in that components (A) and (B) together are in a concentration of at least 15% by weight, based on 100% by weight of components (A), (B), (C) and (D). If the total amount of components (A) and (B) in the mixtures according to the invention is too low, it is very difficult to prepare uniformly covering coatings on a wide variety of substrates.

Component (B) serves as a cross-linking agent for the alkoxy compounds of components (A). The degree of cross-linking of the resulting coating is controlled by the content of component (B), i.e., for coatings providing a soft touch, the degree of cross-linking must not be too high since the tenacity increases with increasing degree of cross-linking. Accordingly, within the meaning of the present invention, it is particularly preferred if the weight ratio of component (A) to component (B) is within a range of from 0.25:1 to 1:100.

For the purpose of the above mentioned object, a mixture is particularly preferred if components (A) and (B) together are in a concentration of at least 25% by weight, based on 100% by weight of components (A), (B), (C) and (D), and the weight ratio of component (A) to component (B) is within a range of from 0.5:1 to 1:25.

In the above described compounds of formula I, the Si—O bonds along the Si—O silicone chain are particularly stable towards hydrolysis. However, for condensation with either other silicone chains or the alkoxides of formula II, at least one further alkoxy group capable of hydrolysis must be contained. Consequently, within the meaning of the present invention, it is preferred if component (A) bears at least one alkoxy group capable of hydrolysis.

In a further preferred embodiment of the present invention, the mixture is characterized in that component (A) is an organosol obtainable by the hydrolysis and condensation of silicon compounds of general formula I, optionally dissolved in organic solvents, wherein R represents the same or different optionally branched hydrocarbon groups with from 1 to 22 carbon atoms, bonded to the silicon atom through a carbon atom and optionally interrupted by oxygen, sulfur, nitrogen or the group $NR^3$, with $R^3$ being hydrogen or $C_1$ to $C_6$ alkyl, and may bear one or more substituents selected from the group consisting of halogens and optionally substituted amino, amido, ammonium, carboxy, mercapto, isocyanato, hydroxy, acryloxy, methacryloxy, epoxy, polyether or perfluorinated alkyl groups, with a diluted inorganic or organic acid.

The proportion of component (B) in the overall mixture is preferably from 0.5 to 40% by weight.

Component (B) to be employed according to the invention may be employed neat or in the form of an alkoxide dissolved in a solvent.

In this respect, it is particularly preferred for component (B) to contain up to 50% by weight of organic solvent, for example, methanol, ethanol, n-propanol, isopropanol, butanol.

Generally, according to the present invention, it is particularly preferred for component (C) to comprise carbonyl compounds, polyethylene, -propylene, -butylene glycols, poly-, tri-, diamines and/or ethanolamines as well as alkyl phosphates.

Even more preferably, the carbonyl compound is selected from 1,3-dicarbonyl compounds.

Component (D) preferably comprises a water-soluble solvent in an amount of from 20 to 85% by weight. Preferably, component (D) comprises one or more protic solvents. It is particularly preferred if component (D) consists of water-soluble solvents and/or protic solvents.

For unproblematic application in textile plants, the low boiling alcohol formed during the hydrolysis can be removed by distillation for increasing the flash point of the mixture according to the invention, especially to temperatures above 65° C., especially above 100° C., without adversely affecting the product properties. The removal of the low boiling components from the reaction system is preferably effected at elevated temperature or under reduced pressure, preferably at elevated temperature and under reduced pressure, the temperature being from 50° C. to 200° C., preferably from 80° C. to 170° C., more preferably from 130° C. to 150° C. Usually, a pressure of from 20 to 900 mbar, preferably from 50 to 250 mbar, is applied.

As the limit of the flash point of the mixture, a temperature is selected which does not require an "$R^{10}$" (flammable) labeling under either the Hazardous Material Regulation (European Agreement Concerning the International Carriage of Dangerous Goods by Road, ADR) or Hazardous Substances Legislation (Handling and Use Regulation, Directive 67/548 EEC). Products having a flash point of >65° C. must not be labeled according to either Handling and Use Regulation or Transport Regulation, and thus, the use thereof in non-explosion-proof plants is to be considered unproblematic.

For the preparation of a transparent storage-stable coating agent from the above mentioned water-compatible sols, the latter are diluted with water at a weight ratio of from 100:1 to 1:500. A thus obtained coating agent preferably has a flash point of at least 100° C.

Another embodiment of the present invention is the use of the coating agent according to the invention for treating organic and inorganic fibers and textiles from aqueous baths and application liquors by spraying, casting, flow coating, dipping, centrifuging, padding, rolling or printing.

The mixture according to the invention or the coating agent may not only contain the actual active ingredient in a dissolved or dispersed form. It is also possible that components of the mixture serve as an active substance, i.e., an active substance need not be added separately (for example, if component (A) contains an ammonium functionality, it has an antibacterial effect; if titanium alkoxides are used in component (B), the resulting coating has UV-absorbing properties). In particular, the mixtures according to the invention and/or the coating agents are employed in combination with finishing agents and/or with suspensions or dispersions of organic and/or inorganic particles and/or sols to produce functionalities, more preferably in combination with hydrophilic, hydrophobic, UV-protecting, flame-retardant and/or antimicrobial finishing agents.

In addition, it is also possible by means of the present invention to employ organic and inorganic fibers and textiles in combination with suspensions or dispersions of organic and/or inorganic particles and/or sols.

For the condensation of components (A) and (B), it is required to expose the substrates provided with the coating agent according to the invention to an elevated temperature. On the one hand, the elevated temperature serves to complete the hydrolysis and condensation reaction, and in addition, it also serves for the more or less complete removal of the solvent. Accordingly, it is particularly preferred according to the present invention to dry the treated textile materials at a temperature within a range of from 60° C. to 250° C. in the course of 10 seconds up to 10 hours.

In addition to textile materials, according to the present invention, it is similarly possible to provide other substrates with the coating agents according to the invention. Therefore, it is particularly preferred according to the present invention to coat substrates made of wood, paper, leather, glass, metal and/or polymeric plastics.

Another embodiment of the present invention naturally includes a textile material to which the above described coating agent has been applied and subsequently dried.

EXAMPLES

1. Example of the Preparation of Alkoxy-Functional Hydrogensiloxanes

In a four-neck flask equipped with a stirrer, thermometer and reflux condenser, 0.5 mol of methyltrimethoxysilane, 1 mol of octamethylcyclotetrasiloxane and 0.018 mol of methylhydrogensiloxane (Wacker BS 94) are charged under nitrogen and heated at 85° C. with stirring. After the addition of 0.1% trifluoromethanesulfonic acid, stirring was performed at this temperature for 5 hours. Subsequently, the acid was neutralized with excess sodium hydrogencarbonate, and the insoluble salts were separated off by means of filtration to obtain a clear low-viscosity liquid having a defined hydrogen content.

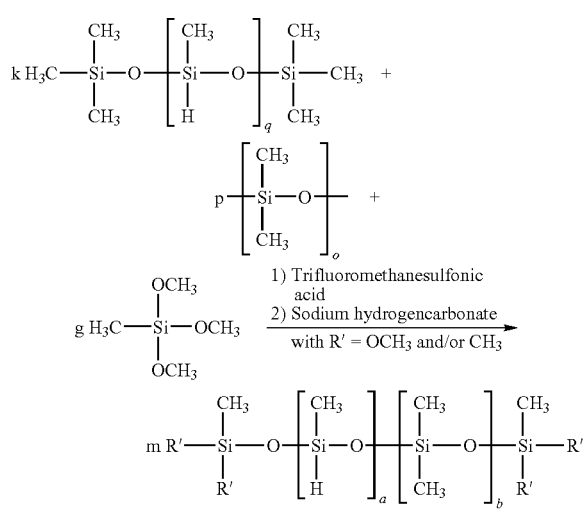

2. Preparation of the Organo-Modified Alkoxysiloxanes

In a four-neck flask equipped with a stirrer, dropping funnel, thermometer and reflux condenser, 0.13 mol of the allyl compound (Table 1) is charged under nitrogen and heated at 60° C. After the addition of 10 ppm of a platinum catalyst, 0.1 mol of the hydrogensiloxane from Example 1 was slowly metered in. Thereafter, stirring was performed at 100° C. until the hydrogen content of the siloxane was <30 ppm. "Hydrogen content" as used herein means the content of Si-bonded hydrogen atoms.

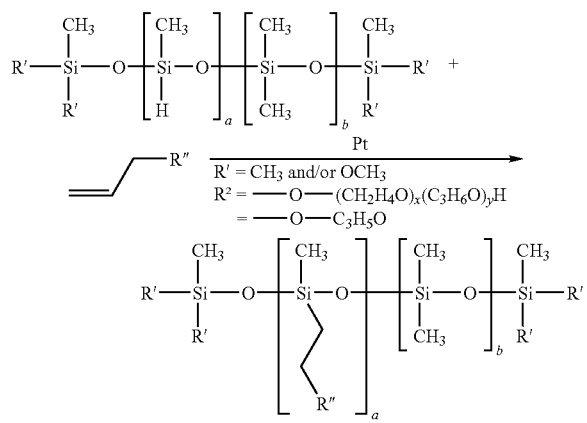

TABLE 1

| Organo-modified alkoxy-siloxane | Allyl compound | Viscosity | Hydrogen content | Appearance |
|---|---|---|---|---|
| RF 369 | Allyl glycidyl ether (Raschig AG) | 100 mPa · s | 13 ppm | clear, yellowish |
| RF 370 | Polyglycol A31/1000 (Clariant) | 550 mPa · s | 27 ppm | slightly turbid, yellowish |

Hydrolysate 1:
234.34 g (1 mol) of 3-glycidyloxypropyltrimethoxysilane was admixed with 15.3 g of 0.1 N (0.85 mol of $H_2O$) aqueous HCl solution with stirring. The mixture, which became clear quickly, was stirred at room temperature for 2 hours to obtain a colorless clear hydrolysate.

Hydrolysate 2:
248.35 g (1 mol) of 3-(trimethoxysilyl)propyl methacrylate was admixed with 15.3 g of 0.1 N (0.85 mol of $H_2O$) aqueous HCl solution with stirring. The mixture, which became clear quickly, was stirred at room temperature for 2 hours to obtain a colorless clear hydrolysate.

Hydrolysate 3:
206 g (1 mol) of (aminoethylaminopropyl)methyldimethoxysilane was admixed with 16.2 g of 0.1 N (0.9 mol of $H_2O$) aqueous HCl solution with stirring. The mixture, which became clear quickly, was stirred at room temperature for 30 minutes to obtain a colorless clear hydrolysate.

Hydrolysate 4:
180.56 g of the organo-modified alkoxysiloxane RF 369 was admixed with 144 g of butyldiglycol, and 2.28 g of 0.1 N aqueous HCl solution was added with stirring. The mixture was stirred at room temperature for 2 hours to obtain a slightly turbid hydrolysate.

Hydrolysate 5:
94.94 g of the organo-modified alkoxysiloxane RF 370 was mixed with 70 g of diethylene glycol butyldiglycol, and 1.08 g of 0.1 N aqueous HCl solution was added with stirring. The mixture was stirred at room temperature for 2 hours to obtain a colorless clear hydrolysate.

Hydrolysate 6:
276.5 g (1 mol) of octyltriethoxysilane was admixed with 16.2 g of 0.1 N (0.9 mol of $H_2O$) aqueous HCl solution with stirring. The mixture, which became clear quickly, was stirred at room temperature for 2 hours to obtain a slightly turbid hydrolysate.

Preparation Protocol 1:
For the preparation of a sol according to the invention, component A) was charged in a beaker at room temperature, and component B) was added with stirring.

Subsequently, the mixture was stirred for 30 minutes. Thereupon, component C) was optionally added slowly. After another 30 minutes of stirring, component D) was added. The solution was further stirred for 30 minutes. Subsequently, the mixture was distilled by means of a rotary evaporator at 150° C. and 200 mbar until a flash point of >65° C. was reached. The resulting solution was slowly cooled down to room temperature. The fractional weight percentages of the respective components and the properties of the products can be seen from Table 2.

Preparation Protocol 2:
For the preparation of a sol according to the invention, component A) was charged in a three-neck flask with a reflux condenser at room temperature, and component B) was added with stirring. Thereupon, component C) was optionally added slowly. Subsequently, the mixture was stirred for 60 minutes. Subsequently, component D) was optionally added. The clear solution was now stirred under reflux at 80° C. for 5 hours. Subsequently, the mixture was distilled by means of a rotary evaporator at 150° C. and 200 mbar until a flash point of >65° C. was reached. The resulting solution was slowly cooled down to room temperature. The fractional weight percentages of the respective components and the properties of the products can be seen from Table 2.

Preparation Protocol 3:
For the preparation of a sol according to the invention, component D) was charged in a three-neck flask with a reflux condenser at room temperature, and component C) was optionally added with stirring. Subsequently, the mixture was further stirred for 30 minutes. Thereupon, component B) and A) were added slowly. A slight exotherm can be observed. The mixture was now stirred under reflux at 80° C. for 5 hours. Subsequently, the mixture was distilled by means of a rotary evaporator at 150° C. and 200 mbar until a flash point of >65° C. was reached. The resulting solution was slowly cooled down to room temperature. The fractional weight percentages of the respective components and the properties of the products can be seen from Table 2.

2) Textile Finishing:

2.1) A sample each of a cotton-polyester mixed fabric (35%/65%) with dimensions of 20×30 cm and a fabric weight of 210 g/m² was finished with a coating liquor according to Table 3 by means of a padder, squeezed to 60% liquor uptake and dried at 120° C. for 2 min, followed by condensation at 150° C. for one minute. The textile sample obtained thereby (T0 to T8) were subjected to the following tests:

a) Sewability Test

The measurement of the stitching force is a method developed by the ITV-Denkendorf. A needle plate sensor below the needle plate of a sewing machine records the stitching force.

TABLE 2

| Sol No. | Hydrolysate 1, % by weight | Hydrolysate 2, % by weight | Hydrolysate 3, % by weight | Hydrolysate 4, % by weight | Hydrolysate 5, % by weight | Hydrolysate 6, % by weight | Zirconium tetrapropanolate 70% in n-propanol, % by weight | Tetraisopropyl titanate, % by weight |
|---|---|---|---|---|---|---|---|---|
| Sol 1 | 5.3 | | | | | | | |
| Sol 2 | 5.37 | | | | | 8.0 | | |
| Sol 3 | 2.79 | 8.77 | | | | | | |
| Sol 4 | | | 9.72 | | | | | |
| Sol 5 | | | | 47.56 | | | | |
| Sol 6 | | | | 37.7 | | | 24.78 | |
| Sol 7 | | | 3.3 | | 33.4 | | 24.78 | |
| Sol 8 | | | | 30.5 | | | | 20.0 |

| Sol No. | Tetraethoxysilane, % by weight | Acetylacetone, % by weight | Glacial acetic acid, % by weight | Diethylene glycol, % by weight | Triethylene glycol, % by weight | Sol appearance | Flash point, ° C. | Preparation protocol |
|---|---|---|---|---|---|---|---|---|
| Sol 1 | 22.4 | | | | 72.3 | colorless, clear | 85.3 | 1 |
| Sol 2 | 18.36 | | | | 68.27 | colorless, clear | 92.5 | 2 |
| Sol 3 | 18.13 | | 2.77 | | 67.54 | colorless, clear | 87.1 | 1 |
| Sol 4 | 20.5 | | 5.5 | 65.05 | | yellow, clear | 84.3 | 3 |
| Sol 5 | 18.0 | | | | 34.44 | colorless, clear | 96.1 | 2 |
| Sol 6 | | 2.67 | | 34.85 | | orange-red, clear | 98.1 | 2 |
| Sol 7 | | 2.67 | 2.14 | | 33.45 | red, clear | 89.6 | 1 |
| Sol 8 | | 4.65 | | 44.85 | | orange-red, clear | 97.7 | 3 |

Determination of the Flash Point:

The flash point was determined by analogy with the standard DIN EN 22719.

Test Relating to Application Technology:

1) Preparation of a Coating Liquor:

In a beaker, 200 g of demineralized water was adjusted to pH 5.5 with acetic acid, and a sol according to Table 3 was added slowly with stirring. The coating liquors B0 to B8 are colorless to yellowish solutions.

TABLE 3

| Textile sample | Coating liquor | Sol No. | Amount of sol employed in g |
|---|---|---|---|
| T0 | B0 | — | 0.0 |
| T1 | B1 | Sol 1 | 6.0 |
| T2 | B2 | Sol 2 | 6.0 |
| T3 | B3 | Sol 3 | 6.0 |
| T4 | B4 | Sol 4 | 6.0 |
| T5 | B5 | Sol 5 | 4.5 |
| T6 | B6 | Sol 6 | 4.5 |
| T7 | B7 | Sol 7 | 4.5 |
| T8 | B8 | Sol 8 | 4.5 |

So-called loop breaking defects are a problem in the clothing industry. When the sewing needle penetrates into the fabric, the yarns must be able to shift alongside each other very quickly. If the fiber-to-fiber friction is too high, the yarns cannot escape the needle and will be broken. By applying fiber-smoothing finishes, such as silicone soft compounds, the frictional forces between the fibers are reduced, and the stitching force is lowered.

Equipment Employed:

measuring device for testing the stitching forces from ITV-Denkendorf sewing needles, type NM 80/12 from Schmetz Preparation:

The samples were conditioned in a standard atmosphere.

Measurement:

The specimens were sewn in double layer in warp direction as in a common sewing machine. The device itself limited the number to 50 stitches at a rate of 1000 stitches per minute. The test was repeated 3 times. The resulting mean value can be seen from Table 4.

TABLE 4

| | | \multicolumn{9}{c}{Sample} | | | | | | | | |
|---|---|---|---|---|---|---|---|---|---|---|
| | | T0 | T1 | T2 | T3 | T4 | T5 | T6 | T7 | T8 |
| Mean value | [cN] | 897 | 1095 | 920 | 943 | 670 | 326 | 434 | 415 | 405 | b) Soft Touch:

The samples finished with the liquors B0 to B8 were compared in terms of their soft touch property.

Table 5 shows the evaluation of the touch rating; for this rating, an experienced team was assembled who rate the anonymized touch samples by means of a hand test. The samples were rated before and after the household washing, wherein the following rating scheme was used:

+++ very soft touch
++ soft touch
+ poor soft touch effects
o no soft touch effects
−hardened touch.

TABLE 5

| | \multicolumn{9}{c}{Sample} | | | | | | | | |
|---|---|---|---|---|---|---|---|---|---|
| | T0 | T1 | T2 | T3 | T4 | T5 | T6 | T7 | T8 |
| Soft touch | o | − | − | − | o | ++ | + | ++ | + |

2.2) A sample each of a white cotton poplin (100 g/m²) with dimensions of 20×30 cm was finished with the coating liquors (B9 to B17) according to Table 6 as described under 2.1. with a liquor uptake of 75%. The textile sample obtained (T9 to T17) were tested as follows:

TABLE 6

| Textile sample | Coating liquor | Sol No. | Amount of sol employed in g |
|---|---|---|---|
| T9 | B0 | — | 0.0 |
| T10 | B10 | Sol 1 | 15.0 |
| T11 | B11 | Sol 2 | 15.0 |
| T12 | B12 | Sol 3 | 15.0 |
| T13 | B13 | Sol 4 | 15.0 |
| T14 | B14 | Sol 5 | 10.0 |
| T15 | B15 | Sol 6 | 10.0 |
| T16 | B16 | Sol 7 | 10.0 |
| T17 | B17 | Sol 8 | 10.0 | a) Influence on the Color

Table 7 states the Berger whiteness values. The measurement was performed after fixation at 150° C. An untreated sample (T9) serves as a comparative sample. The influence on the color was determined with the color measuring device SF600 PLUS-CT by Datacolor International. The influence of the finish on the color increases with decreasing Berger units.

TABLE 7

| | \multicolumn{9}{c}{Sample} | | | | | | | | |
|---|---|---|---|---|---|---|---|---|---|
| | T9 | T10 | T11 | T12 | T13 | T14 | T15 | T16 | T17 |
| Berger whiteness | 86 | 85 | 84 | 85 | 78 | 84 | 75 | 72 | 70 | b) Abrasion Resistance Test

The abrasion resistance according to DIN EN ISO 12947-2 was tested on a Martindale abrasion tester until the sample was destroyed.

Equipment Employed:
  Sample cutter, d=38 mm
  Martindale abrasion tester (6 test points) from James H. Heal & Co. Ltd.
  Weights: 9 kPa
Preparation:
  Conditioning of the samples and cutting with sample cutter.

Measurement:
  The specimens were clamped into the designated fixtures together with equally sized foam pieces as a substrate, laid on the abrasion fabric which was clamped in the device, and loaded with the weights. After the device was switched on, abrasion was performed until the sample was destroyed. By analogy with the DIN standard, a new abrasion fabric and a new foam was used for each measurement. The tests are performed in a normalized atmosphere. The number of abrasion cycles until the textile is destroyed is shown in Table 8.

TABLE 8

| | \multicolumn{9}{c}{Sample} | | | | | | | | |
|---|---|---|---|---|---|---|---|---|---|
| | T9 | T10 | T11 | T12 | T13 | T14 | T15 | T16 | T17 |
| Result in cycles | 9000 | 31000 | 28000 | 26500 | 15000 | 18000 | 20500 | 17500 | 23000 |

The invention claimed is:

1. A process for treating organic and inorganic fibers and textiles from aqueous baths and application liquors by spraying, casting, flow coating, dipping, centrifuging, padding, rolling or printing the transparent and storage-stable coating agent thereon, said transparent and storage-stable coating agent containing a water-compatible sol and water in a weight ratio of 100:1 to 1:500; said water-compatible sol obtained by mixing the following components:
(A) from 0.5 to 40% by weight of an organosol obtainable by the hydrolysis and condensation of one or more silicon compounds of general formula I

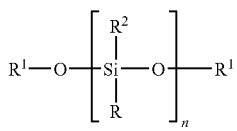 (I)

wherein
R represents the same or different hydrocarbon groups with from 1 to 22 carbon atoms, optionally substituted with functional groups which are bonded to the silicon atom through a carbon atom, optionally interrupted by oxygen, sulfur, nitrogen or the group $NR^3$, with $R^3$ being hydrogen or $C_1$ to $C_{14}$ alkyl;
the radicals $R^1$ are the same or different and represent $R^4$ or $Si(R^5)_3$, wherein $R^4$ are the same or different and each represent an optionally substituted hydrocarbon group with from 1 to 8 carbon atoms, optionally interrupted by oxygen, sulfur, nitrogen or the group $NR^3$ with the meaning mentioned above; and $R^5$ is $R^4$ and/or $O-R^4$;
$R^2$ are the same or different and represent $O-R^1$ or $R^4$, $R^1$ and $R^4$ having the meanings as mentioned above; and
n is from 1 to 30;
(B) from 0 to 40% by weight of one or more alkoxides of general formula II $$Me(OR^4)_m \quad (II)$$

wherein
in the case where n=1, Me represents Si and m is 4, and in the case where n>1, Me represents Si, Ti, Zr, Hf or Al, and m is the valence of the metal cation, and $R^4$ has the meaning mentioned above;
(C) from 0 to 8% by weight of one or more complexing agents for reducing the hydrolysis rate of components (A) and (B); and
(D) from 12 to 99.5% by weight of one or more water-compatible or water-miscible solvents having a boiling point of at least 150 ° C.;
respectively based on 100% by weight of components (A), (B), (C) and (D) characterized in that alcohols having a boiling point of at most 160 ° C., formed during hydrolysis, are removed by distillation to adjust the flash point.

2. The process according to claim 1, characterized in that components (A) and (B) are charged together in a concentration of at least 15% by weight, based on 100% by weight of components (A), (B), (C) and (D), and the weight ratio of (A) to (B) is from 0.25:1 to 1:100.

3. The process according to claim 1, characterized in that components (A) and (B) are charged together in a concentration of at least 15% by weight, based on 100% by weight of components (A), (B), (C) and (D), and the weight ratio of (A) to (B) is from 50:1 to 1:100.

4. The process according to claim 1, characterized in that components (A) and (B) are charged together in a concentration of at least 25% by weight, based on 100% by weight of components (A), (B), (C) and (D), and the weight ratio of (A) to (B) is from 0.5:1 to 1:25.

5. The process according to claim 1, characterized in that components (A) and (B) are charged together in a concentration of at least 25% by weight, based on 100% by weight of components (A), (B), (C) and (D), and the weight ratio of (A) to (B) is from 25:1 to 1:25.

6. The process according to claim 1, characterized in that component (A) bears at least one alkoxy group capable of hydrolysis.

7. The process according to claim 1, wherein component A bears one or more substituents selected from the group consisting of halogens and optionally substituted amino, amido, ammonium, carboxy, mercapto, isocyanato, hydroxy, acryloxy, methacryloxy, epoxy, polyether or perfluorinated alkyl groups.

8. The process according to claim 1, characterized in that component (A) with n >1 is prepared by an equilibration and subsequent hydrosilylation reaction.

9. The process according claim 1, characterized in that from 0.5 to 40% by weight of component (B) is employed.

10. The process according to claim 1, characterized in that a component (B) comprising up to 50% by weight of organic solvent is employed.

11. The process according to claim 1, characterized in that a component (C) comprises carbonyl compounds, polyethylene glycol, propylene glycol, butylene glycol, polyamines, triamines, diamines, ethanolamines, or alkyl phosphates.

12. The process according to claim 11, characterized in that said carbonyl compound is selected from 1,3-dicarbonyl compounds.

13. The process according to claim 1, characterized in that at least 0.2% by weight of component (C) is employed.

14. The process according to claim 1, characterized in that component (D) comprises a water-soluble solvent in an amount of from 20 to 85% by weight.

15. The coating agent according to claim 1 having a flash point of at least 65 ° C.

16. The process according to claim 1, wherein the transparent and storage-stable coating agent is in combination with finishing agents and/or with suspensions or dispersions of organic and/or inorganic particles and/or sols to produce functionalities.

17. The process according to claim 16, wherein said storage-stable coating agent is further in combination with hydrophilic, hydrophobic, UV-protecting, flame-retardant and/or antimicrobial finishing agents.

18. A process comprising coating organic and inorganic fibers and textiles with the transparent and storage-stable coating agent in combination with suspensions or dispersions of organic and/or inorganic particles and/or sols, said transparent and storage-stable coating agent containing a water-compatible sol and water in a weight ratio of 100:1 to 1:500, said water-compatible sol obtained by mixing the following components:
(A) from 0.5 to 40% by weight of an organosol obtainable by the hydrolysis and condensation of one or more silicon compounds of general formula I

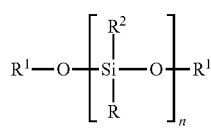

(I)

wherein
R represents the same or different hydrocarbon groups with from 1 to 22 carbon atoms, optionally substituted with functional groups, which are bonded to the silicon atom through a carbon atom, optionally interrupted by oxygen, sulfur, nitrogen or the group $NR^3$, with $R^3$ being hydrogen or $C_1$ to $C_{14}$ alkyl;

the radicals $R^1$ are the same or different and represent $R^4$ or $Si(R^5)_3$, wherein $R^4$ are the same or different and each represent an optionally substituted hydrocarbon group with from 1 to 8 carbon atoms, optionally interrupted by oxygen, sulfur, nitrogen or the group $NR^3$ with the meaning mentioned above; and $R^5$ is $R^4$ and/or $O-R^4$;

$R^2$ are the same or different and represent $O-R^1$ or $R^4$, $R^1$ and $R^4$ having the meanings as mentioned above; and n is from 1 to 30;

(B) from 0 to 40% by weight of one or more alkoxides of general formula II $$Me(OR^4)_m \quad (II)$$

wherein
in the case where n=1 Me represents Si and m is 4 and in the case where n>1, Me represents Si, Ti, Zr, Hf or Al, and m is the valence of the metal cation, and $R^4$ has the meaning mentioned above;

(C) from 0 to 8% by weight of one or more complexing agents for reducing the hydrolysis rate of components (A) and (B); and (D) from 12 to 99.5% by weight of one or more water-compatible or water-miscible solvents having a boiling point of at least 150° C.;

respectively based on 100% by weight of components (A), (B), (C) and (D) characterized in that alcohols having a boiling point of at most 160° C., formed during hydrolysis, are removed by distillation to adjust the flash point.

19. The process according to claim 1, wherein the treated textile materials are dried at a temperature within a range of from 60° C. to 250° C. in the course of 10 seconds up to 10 hours.

20. The process comprising coating substrates made of textiles, wood, paper, leather, glass, metal and/or polymeric plastics with the transparent and storage-stable coating agent, said transparent and storage-stable coating agent containing a water-compatible sol and water in a weight ratio of 100:1 to 1:500; said water-compatible sol obtained by mixing the following components:

(A) from 0.5 to 40% by weight of an organosol obtainable by the hydrolysis and condensation of one or more silicon compounds of formula I

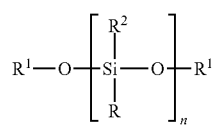

(I)

wherein
R represents the same or different hydrocarbon groups with from 1 to 22 carbon atoms, optionally substituted with functional groups, which are bonded to the silicon atom through a carbon atom, optionally interrupted by oxygen, sulfur, nitrogen or the group $NR^3$, with $R^3$ being hydrogen or $C_1$ to $C_{14}$ alkyl;

the radicals $R^1$ are the same or different and represent $R^4$ or $Si(R^5)_3$, wherein $R^4$ are the same or different and each represent an optionally substituted hydrocarbon group with from 1 to 8 carbon atoms, optionally interrupted by oxygen, sulfur, nitrogen or the group $NR^3$ with the meaning mentioned above; and $R^5$ is $R^4$ and/or $O-R^4$;

$R^2$ are the same or different and represent $O-R^1$ or $R^4$, $R^1$ and $R^4$ having the meanings as mentioned above; and n is from 1 to 30;

(B) from 0 to 40% by weight of one or more alkoxides of general formula II $$Me(OR^4)_m \quad (II)$$

wherein
in the case where n=1, Me represents Si and m is 4, and in the case where n>1, Me represents Si, Ti, Zr, Hf or Al, and m is the valence of the metal cation, and $R^4$ has the meaning mentioned above;

(C) from 0 to 8% by weight of one or more complexing agents for reducing the hydrolysis rate of components (A) and (B); and (D) from 12 to 99.5% by weight of one or more water-compatible or water-miscible solvents having a boiling point of at least 150° C.;

respectively based on 100% by weight of components (A), (B), (C) and (D) characterized in that alcohols having a boiling point of at most 160° C., formed during hydrolysis, are removed by distillation to adjust the flash point.

21. A textile material comprising a transparent and storage-stable coating agent dried after having been applied to the surface of the material, said transparent and storage-stable coating agent containing a water-compatible sol and water in a weight ratio of 100:1 to 1:500; said water-compatible sol obtained by mixing the following components:

(A) from 0.5 to 40% by weight of an organosol obtainable by the hydrolysis and condensation of one or more silicon compounds of general formula I

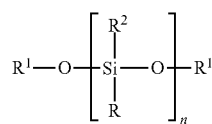

(I)

wherein
R represents the same or different hydrocarbon groups with from 1 to 22 carbon atoms, optionally substituted with functional groups, which are bonded to the silicon atom through a carbon atom, optionally interrupted by oxygen, sulfur, nitrogen or the group $NR^3$, with $R^3$ being hydrogen or $C_1$ to $C_{14}$ alkyl;

the radicals $R^1$ are the same or different and represent $R^4$ or $Si(R^5)_3$, wherein $R^4$ are the same or different and each represent an optionally substituted hydrocarbon group with from 1 to 8 carbon atoms, optionally interrupted by oxygen, sulfur, nitrogen or the group $NR^3$ with the meaning mentioned above; and $R^5$ is $R^4$ and/or $O-R^4$;

$R^2$ are the same or different and represent $O-R^1$ or $R^4$, $R^1$ and $R^4$ having the meanings as mentioned above; and n is from 1 to 30;

(B) from 0 to 40% by weight of one or more alkoxides of general formula II $$Me(OR^4)_m \qquad (II)$$

wherein in the case where n=1 Me represents Si and m is 4 and in the case where n>1, Me represents Si, Ti, Zr, Hf or Al, and m is the valence of the metal cation, and $R^4$ has the meaning mentioned above;

(C) from 0 to 8% by weight of one or more complexing agents for reducing the hydrolysis rate of components (A) and (B); and (D) from 12 to 99.5% by weight of one or more water-compatible or water-miscible solvents having a boiling point of at least 150 °C.;

respectively based on 100% by weight of components (A), (B), (C) and (D) characterized in that alcohols having a boiling point of at most 160 °C., formed during hydrolysis, are removed by distillation to adjust the flash point.

\* \* \* \* \*